Aug. 18, 1970  L. F. CRAEMER ET AL  3,524,621
PRESSURE SNAP CONTROL VALVE
Filed Jan. 31, 1968

INVENTORS
LAMBERT F. CRAEMER
JAMES N. BROOKS

Christen, Sabol, O'Brien & Caldwell
ATTORNEYS

United States Patent Office 3,524,621
Patented Aug. 18, 1970

3,524,621
PRESSURE SNAP CONTROL VALVE
Lambert F. Craemer, Orange, and James N. Brooks, Hermosa Beach, Calif., assignors to Robertshaw Controls Company, Richmond, Va., a corporation of Delaware
Filed Jan. 31, 1968, Ser. No. 701,924
Int. Cl. F16k 31/44
U.S. Cl. 251—75                    9 Claims

ABSTRACT OF THE DISCLOSURE

A flow control device having a resilient valve element mounted on an actuating lever with restraint means providing two different effective diameters in a direction perpendicular to its plane so that the valve element remains closed during initial movement due to pressure differential effect and opens with a snap action during final lever movement in the opening direction.

BACKGROUND OF THE INVENTION

The present invention relates to flow control devices and in particular to a control valve that is provided with a snap action during its opening movement.

It is conventional practice in the control valve art to obtain snap action of a valve element by means of separate devices such as overcenter mechanisms. Such conventional control valves perform satisfactory for their particular designs but are not necessarily adaptable or feasible for all kinds of structures and where useable, they require a relatively high applying force to effect transfer of the snap action devices.

SUMMARY OF THE INVENTION

It is, therefore, an object of the present invention to construct a simple, economical snap acting control valve.

This invention has another object in that snap action is imparted to a control valve by pressure of the controlled flow.

A further object of this invention is to utilize the pressure of a fluid in a control valve to retain its valve element in a closed position during initial opening movement of the valve actuator.

The present invention is summarized in that a control valve casing is provided with an inlet, an outlet and a fluid flow chamber therebetween, a fixed valve seat in the chamber communicating with the outlet, actuating means including a movable lever in the chamber, a fluid pressure chamber in the movable lever communicating with the fluid flow chamber, a valve element carried by the lever having one side cooperating with the fixed valve seat and an opposite side communicating with the fluid pressure chamber which exerts a pressure force thereon, and a portion of the valve element being retained against the fixed valve seat in response to pressure in the fluid pressure chamber during initial movement of the lever.

Other objects and advantages of the present invention will become apparent from the following description of a preferred embodiment taken in conjunction with the accompanying drawing.

DESCRIPTION OF THE PREFERRED EMBODIMENT

Figure 1:
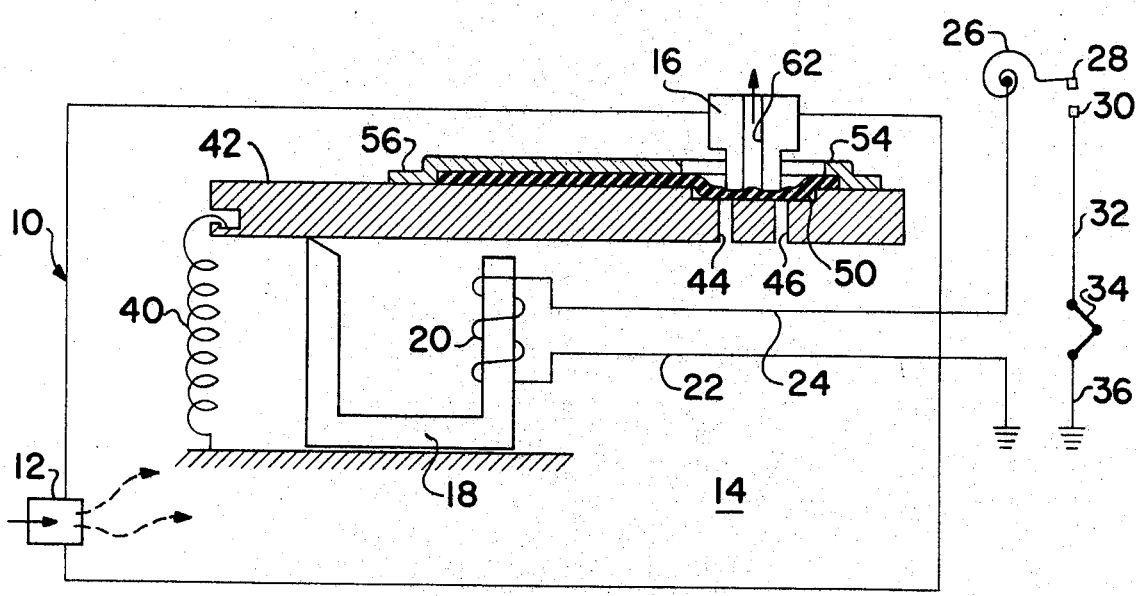
FIG. 1 is a schematic diagram of a control device embodying the present invention.

As is illustrated in FIG. 1, the present invention is embodied in a fluid flow control device, indicated generally at 10, having an inlet fitting 12 establishing communication between a source of fluid (not shown) and a valve chamber or cavity 14 which has an outlet fitting 16. A valve actuator mechanism includes an electromagnetic core 18 fixed to an internal casing wall in the cavity 14; an electric coil 20 wound on the core 18 has one end connected to ground by means of a conductor 22 and its other end connected to a conductor 24 that is electrically connected to a thermal sensing device in the form of a spiral bimetal 26. The free end of the bimetal 26 carries a contact 28 for movement relative to a fixed contact 30 having a conductor 32 leading to a series connected thermopile or thermocouple 34 that is connected to ground by means of a conductor 36.

A coil spring 40 is mounted in tension with one end fixed to the internal casing wall and its other end fixed to an armature plate 42 which is pivotally mounted on a fulcrum defined by one leg of the magnetizable core 18. The tension spring 40 normally biases the armature plate 42 counterclockwise about the fulcrum on the core 18 which when energized exerts an attracting force of greater magnitude than the biasing force to cause clockwise pivoting of the armature plate 42.

Figures 2, 3:
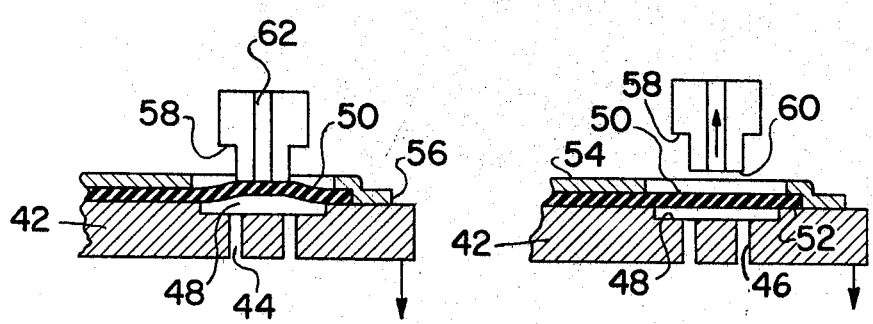
FIG. 2 is a partial view of a detail of FIG. 1 in another position.
FIG. 3 is a partial view similar to FIG. 2 showing the detail in still another position.

One or more bores or ports 44 and 46 transversely extend through the armature plate 42 adjacent its free end. The ports 44 and 46 establish communication between the cavity 14 and a cylindrical recess 48 in the top surface of the armature plate 42. As best shown in FIG. 3, the recess 48 is covered with a valve element 50 made of any suitable resilient material, such as rubber. The valve element 50 completely overlies the recess 48 and it has an outer peripheral portion 52 supported on the adjacent surface of the armature plate 42. The mounting portion 52 of the valve element 50 is secured to the armature plate 42 by any suitable means, such as a retainer plate 54 having a hole concentric with and larger in diameter than recess cavity 48; the retainer 54 clampingly engages the mounting portion 52 and has an offset outer peripheral part 56 fastened as by screws (not shown) to the armature plate 42. The hole in retainer plate 54 has a greater diameter than the diameter of the recess 48.

The lower part of the outlet fitting 16 is reduced in diameter as defined by an annular shoulder 58 and terminates in an annular valve seat 60 oppositely disposed to the valve element 50. The central axis of the outlet fitting is drilled to form an outlet port 62. The valve element 50 is moved toward and away from the valve seat 60 in accordance with armature movement.

FIG. 1 shows the "off" position of the flow control device with the valve element 50 being closed on the valve seat 60 so there is no flow through the outlet port 62. In its "off" position, the valve element 50 is somewhat compressed due to the biasing force of the spring 40. It is to be noted that the valve seat 60 in depressing the resilient valve element 50 to the bottom of the cavity 48 has caused the resilient valve element 50 to conform to small irregularities in the surface of the valve face 60. The control device is actuated to its "on" position in response to closure of the contacts 28-30 by the spiral bimetal 26 whereby the magnet core 18 is energized causing the armature plate 42 to pivot clockwise against the bias of the coil spring 40. Such clockwise movement is illustrated by the downwardly directed arrows in FIGS. 2 and 3. During initial downward movement of armature plate 42 the resilient valve element 50 is decompressed. With continued movement of the armature plate 42, the resilient valve element 50 follows the valve seat 60 aided by the tendency of the material to resume its flat condition and aided by the fluid pressure in cavity 48; with additional movement of the armature plate 42, the resilient valve element 50 continues to follow the valve seat 60 being restrained only by the peripheral wall defining the relatively large diameter opening in the thin flat plate 54 as shown in FIG. 2. The final downward movement of the armature plate 42 causes separation of the valve element 50 from the valve seat 60 whereupon the fluid in the valve chamber 14 is permitted to flow through the outlet port 62. The above arrangement has the particular advantage of providing a valve member with a snap action movement that is effected by the pressure of the fluid being controlled.

The particular structure of the pressure actuator snap acting valve eliminates the tendency for leakage as would occur with an actuator that may not be pulled with sufficient force to open the valve completely. For instance, the electrical circuit shown in FIG. 1 is a millivolt system wherein the thermopile 34 output varies with the size of the pilot flame and tends to diminish with normal deterioration of the thermopile. Therefore, sometime in the life of the system, the thermopile output may be less than that required to move the armature plate 42 to the complete clockwise direction. The action of the resilient valve element 50 prevents leakage of the fluid through port 62 until the armature has completed its clockwise travel. As the armature plate 42 initially moves slowly toward its attracted position, the valve element 50 is decompressed slightly from its compressed condition. Upon continued movement of the armature plate 42, the valve element 50 remains seated on the outlet seat 60 (FIG. 2) because the lower surface of the valve element 50 has a larger area subjected to pressure (in the recess 48) than its upper surface. When the pull-in potential is reached, the valve element 50 is pulled with a snap action to its open position and the pressure differential between its upper and lower surfaces causes the valve element to resume its normal flat condition as shown in FIG. 3.

When the magnet core 18 is deenergized as by opening of the bimetal contacts 28-30, the armature plate 42 is returned to its FIG. 1 position by being pivoted counterclockwise by the coil spring 40. Since the central opening of the valve retainer 54 is larger than the reduced portion, the valve element 50 first forms a small radius spherical section against the entrance to the port 62; the valve element 50 then bottoms on the wall of the recess 48 after-which the valve element 50 is compressed and completely seals the valve seat 60.

Inasmuch as the present invention is subject to many modifications, variations and changes in detail, it is intended that all matter contained in the foregoing description or shown in the accompanying drawing shall be interpreted as illustrative and not in a limiting sense.

What is claimed is:

1. In a flow control device, the combination comprising
   a casing having inlet means, outlet means and a fluid flow cavity therebetween,
   a fixed valve seat in said cavity communicating with said outlet means,
   actuating means including a movable element movable between first and second controlling positions in said cavity,
   means defining a fluid pressure chamber in said movable element communicating with said cavity,
   valve means carried by said movable element having one side cooperating with said fixed valve seat and an opposite side communicating with said fluid pressure chamber,
   said fluid pressure chamber exerting a pressure force on the opposite side of said valve means, and
   a portion of said valve means being compressed between said valve seat and said movable element when the same is in its first controlling position, said portion of said valve means being retained against said valve seat in response to pressure in said fluid pressure chamber during initial movement of said movable element from its first to its second controlling position whereby the final movement thereof causes said valve means to move with a snap action.

2. The invention as recited in claim 1 wherein said valve means includes a resilient valve element and the said portion of said valve means is a central part of said valve element.

3. The invention as recited in claim 2 wherein said valve element has a cross-sectional dimension larger than said fixed valve seat.

4. The invention as recited in claim 3 wherein said fluid pressure chamber is defined by a recess in said movable element and said valve element covers said recess to define a movable wall thereof.

5. The invention as recited in claim 4 wherein a retainer plate secures a peripheral portion of said valve element to said movable element and said retainer plate has a central aperture larger than the recess in said movable element whereby said valve element has a freer movement towards said valve seat than away therefrom.

6. The invention as recited in claim 4 wherein a retainer plate secures a peripheral portion of said valve element to said movable element and said retainer plate has a central aperture larger than said fixed valve seat whereby the central part of said valve element is compressed thereagainst by said movable element when actuated to a closed position.

7. The invention as recited in claim 6 wherein said movable element comprises a plate having port means establishing communication between said recess and said fluid flow cavity.

8. The invention as recited in claim 7 wherein the central part of said valve element closes said port means and said valve seat when said plate is in its closed position.

9. In a flow control device, the combination comprising
   a casing having an inlet adapted to be connected to a source of fluid flow, a fluid flow cavity communicating with the inlet, and a fixed valve seat in said cavity defining an outlet for the fluid flow,
   a valve lever in said cavity movable between controlling positions,
   biasing means biasing said lever to a valve closed position,
   operating means for moving said lever to a valve opened position,
   means defining a fluid pressure chamber in said lever,
   fluid port means in said lever having one end communicating with said cavity and another end opening into said fluid pressure chamber,
   a dual faced, flexible valve element carried by said lever and defining a movable wall of said fluid pressure chamber,
   said movable wall having one face cooperating with said fixed valve seat and another face cooperating with said another end of the fluid port means,
   the faces of said movable wall being separated from said fixed valve seat and the said another end of the fluid port means when said lever is in its valve opened position whereby a fluid flow is permitted from said cavity through said fixed valve seat,
   the faces of said movable wall being compressed against said fixed valve seat and the said another end of the fluid port means when said lever is in its valve opened position whereby the fluid flow from said cavity through said fixed seat and through said fluid port means is cut off, and the said another face of said movable wall being separated from the said another end of the fluid port means during initial movement of said lever from its valve closed position permitting the fluid flow into said fluid pressure chamber causing said movable wall to be compressed with its said one face being retained against said fixed valve seat in response to pressure in said fluid pressure chamber whereby final movement of said lever causes the said one face of said movable wall to move with a snap action away from said fixed valve seat.

References Cited
UNITED STATES PATENTS

| | | | |
|---|---|---|---|
| 2,222,141 | 11/1940 | Denison | 251—75 XR |
| 2,409,112 | 10/1946 | Dillman | 251—75 |
| 2,631,598 | 3/1953 | Dillman et al. | 251—66 XR |
| 3,063,125 | 12/1962 | Hewitt | 251—75 |
| 3,229,956 | 1/1966 | White | 251—11 |
| 3,353,559 | 11/1967 | Phillips | 251—75 XR |

RONALD FELDBAUM, Primary Examiner